(12) United States Patent
Srivastava et al.

(10) Patent No.: US 11,354,272 B2
(45) Date of Patent: Jun. 7, 2022

(54) METHOD AND SYSTEM FOR REPORTING FREE DISK STORAGE IN FILE SYSTEMS

(71) Applicant: JPMorgan Chase Bank, N.A., New York, NY (US)

(72) Inventors: Rahul Srivastava, Hyderabad (IN); Venkata Satyanarayana Kandepu, Hyderabad (IN); Paul Robinson, Ringwood (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 21 days.

(21) Appl. No.: 16/575,608

(22) Filed: Sep. 19, 2019

(65) Prior Publication Data

US 2020/0089658 A1    Mar. 19, 2020

Related U.S. Application Data

(60) Provisional application No. 62/733,254, filed on Sep. 19, 2018.

(51) Int. Cl.
| | |
|---|---|
| *G06F 7/00* | (2006.01) |
| *G06F 16/17* | (2019.01) |
| *G06F 16/182* | (2019.01) |

(52) U.S. Cl.
CPC ...... *G06F 16/1727* (2019.01); *G06F 16/1734* (2019.01); *G06F 16/1824* (2019.01)

(58) Field of Classification Search
CPC ............... G06F 16/122; G06F 16/1734; G06F 16/1824; G06F 16/1727
USPC ........... 707/679, 823, 999.003, 740, 999.102
See application file for complete search history.

(56) References Cited

U.S. PATENT DOCUMENTS

| | | | |
|---|---|---|---|
| 2004/0078461 A1* | 4/2004 | Bendich | .............. G06F 11/3495 709/224 |
| 2013/0086273 A1* | 4/2013 | Wray | .................... G06F 9/5072 709/226 |

* cited by examiner

*Primary Examiner* — Md I Uddin

(74) *Attorney, Agent, or Firm* — Greenblum & Bernstein, P.L.C.

(57) ABSTRACT

An embodiment of the present invention is directed to determining non-utilized storage within a file system and providing a meaningful report for reclaims. An embodiment of the present invention is directed to implementing a reporting tool for presenting information about the storage allocated to one or more Linux servers, file systems as well as other components, resources and/or systems. The data may then be used to aid decision making for performing reclaims of the storage which may be highlighted as unused.

20 Claims, 6 Drawing Sheets

Figure 2

METHOD AND SYSTEM FOR REPORTING FREE DISK STORAGE IN FILE SYSTEMS

CROSS REFERENCE TO RELATED APPLICATIONS

The application claims priority to U.S. Provisional Application 62/733,254, filed Sep. 19, 2018, the contents of which are incorporated herein in its entirety.

FIELD OF THE INVENTION

The invention relates generally to a method and system for implementing a disk reporting tool for file systems and specifically directed to identifying non-utilized storage inside a file system, such as Linux operating system (OS) file systems.

BACKGROUND OF THE INVENTION

For large companies, a Linux server estate can be expansive with many instances (over 75,000 instances) including physical and virtual servers. Currently, systems do not offer an easy way to identify non-utilized storage inside file systems. Oftentimes, a new storage is allocated to a server hut the new storage is not fully utilized. In other instances, a file system is created but left empty or severely underutilized. Also, applications can be decommissioned but the storage may not be released. Accordingly, available storage is oftentimes wasted and goes unused.

These and other drawbacks exist.

SUMMARY OF THE INVENTION

According to one embodiment, the invention relates to a method that reports free disk storage in file systems. The method comprises the steps of: receiving, via a data feed, data fetched from one or more network attached storage (NAS) devices from a plurality of file systems, wherein the data comprises data usage information; processing, via a centralized processor, the data from the data feed to identify disk space capacity; generating a disk usage report based on the processed data, wherein the disk usage report comprises file system information; and displaying the disk usage report comprising unused data and total unused disk size on an interactive user interface, via a network connection.

According to another embodiment, the invention relates to a system that reports free disk storage in file systems. The system comprises: a memory that stores disk storage data; a input configured to receive data from a datafeed; and a centralized computer processor, coupled to the memory and input, configured to perform the steps of: receiving, via the data feed, data fetched from one or more network attached storage (NAS) devices from a plurality of file systems, wherein the data comprises data usage information; processing, via the centralized processor, the data from the data feed to identify disk space capacity; generating a disk usage report based on the processed data, wherein the disk usage report comprises file system information; and displaying the disk usage report comprising unused data and total unused disk size on an interactive user interface, via a network connection.

The computer implemented system and method described herein provide unique advantages to entities, organizations and other users, according to various embodiments of the invention. An embodiment of the present invention is directed to identifying opportunities on servers and reporting to various support teams or line of business (LOB) owners who can then initiate decisions on charging them back to a storage area network (SAN) team. This provides cost savings and improved utilization of resources for the LOB and the organization. In addition, implementation of a Disk Usage Reporting Tool may provide useful information (e.g., logic volume management (LVM) file system information, etc.) from a file system utilization perspective for change planning and implementation. It also provides information on storage that is provisioned on the server but not being used (e.g., unallocated storage). This storage may then be utilized for a future purpose or may be reclaimed. Accordingly, an embodiment of the present invention provides improved utilization and resource efficiencies. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2 is an exemplary screenshot of a Free Disk Reporting interface, according to an embodiment of the present invention.

DETAILED DESCRIPTION OF THE PREFERRED EMBODIMENT(S)

Figure 1:
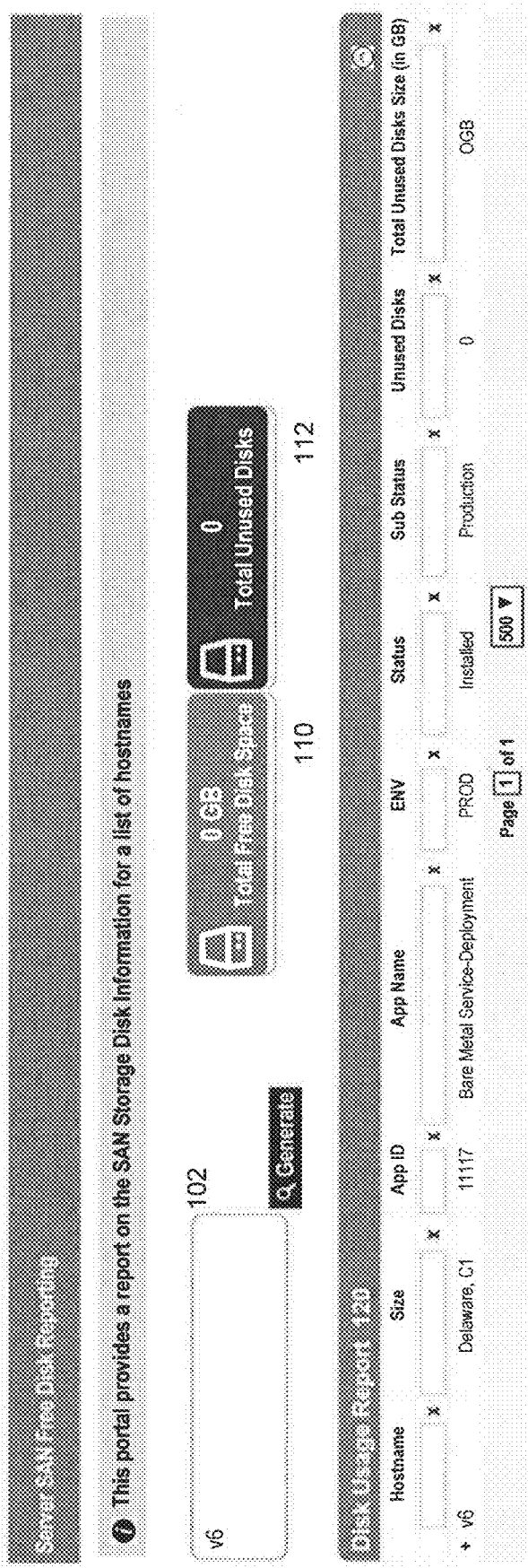
FIG. 1 is an exemplary screenshot of a Free Disk Reporting interface, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a Free Disk Reporting (FDR) tool that provides insight to storage allocations on servers, file systems and/or other systems. The FDR Tool may be used to examine various file systems, such as logical volume management (LVM) file systems, and identify unused storage that may be better utilized or reclaimed. Other actions and responses may be applied.

An embodiment of the present invention is directed to determining non-utilized storage within a file system and providing a meaningful report for reclaims and other utilizations. File systems may include Linux systems, Live File Systems, cluster-type file systems, etc. According to an embodiment of the present invention, file systems provide a way in which files may be named and placed logically for storage and retrieval. This may refer to shared disk file systems, shared block storage, local file systems, etc. File systems may provide a naming and organizational methodology that defines how a file can be named and logical structure of the data on a disk, including use of directories for organizing files. Directories may include folders, for example. In Linux and other operating systems, directories may be structure in a tree-like hierarchy. File systems may also unify physical hard drives and partitions into a single directory structured that starts at the top root directory where other directories and subdirectories may be located under the top root directory. File systems may be created on separate physical hard drives, different partitions and/or different logical volumes. In addition, removable drives and external drives (e.g., including hard drives, optical drives, flash drives, etc.) may be mounted onto a root file system and become integrated with the directory tree, Live File Systems may refer to a packet writing method of creating disks where files may be added incrementally. Live File Systems enable users to incrementally add individual files or groups of files over time and it also provides flexibility to increase file system space at runtime. For example, the Live File Systems may include logical volume manager (LVM) Veritas, automatic storage management (ASM), etc. Cluster file system may refer to a shared disk file system in a cluster environment that increases storage performance and availability.

An embodiment of the present invention is directed to providing a comprehensive representation of a file system and detailed current usage as well as other metrics. An innovative method and system of an embodiment of the present invention determines available storage, such as volume groups, disk groups, ASM groups on various servers, and then reports available physical volumes inside it. The innovative method and system may examine a current inventory and further report a region, application name, environment and status of the asset as well as related or associated assets or components.

An embodiment of the present invention provides a unique combination of features. For example, an embodiment of the present invention provides: information of non-utilized storage within a file system and information for non-utilized storage outside the file system but provisioned to the server. The innovative method and system further enables a user to readily access storage related attributes such as world-wide name (WWN), Vendor:Model, disk name, logical unit number identifier (LUNID), etc. This may be particularly useful for reclaims. Associating a world-wide name (WWN) to a logical unit number (LUN) within a storage array is a way of implementing data security in the SAN. WWN represents a unique identifier used in storage technologies.

An embodiment of the present invention may be implemented for various applications and purposes, including: performing an online reclaim and providing region, datacenter, Application ID (used to identify or manage an application) information. The innovative method may also be used for storage usage and future predictions for region-wise, datacenter wise, etc.

An embodiment of the present invention may be used and accessed by various types of users, including teams such as GSO Unix/Linux; GSO Security Engineering; UNIX CIE; SAN Engineering team; UNIX BAC team; Linux build team; VSI Engineering team; ESX CIE team; and development team. GSO represents a Sub-Line of Business and may generally refer to Global Technology Infrastructure Service Operations. CIE stands for Continuous Improvement Engineering. BAC represents Business Aligned Change, which may be a sub group of GSO. ESX in this instance refers to the team that supports VMware (a server virtualization product). The OS that underlies the VMware technology is call ESX. The development team may act as an automated solution for identifying and retrieving unused storage.

An embodiment of the present invention is directed to generating an interactive graphic view, e.g., a bird's eye view, of storage allocations, configuration parameters and utilization in LVM, cluster and ASM for various use cases. The tool may then generate informed decisions for applications and projects. An embodiment of the present invention may be applied to various systems, including LVM file systems, virtual server and file systems, ASM file systems, extent-based file system (e.g., Veritas file systems), unallocated storage, etc.

For LVM file system, an embodiment of the present invention may retrieve a disk utilization in LVM file system; determine physical volumes that are completely unused; identify physical volumes that are underutilized and predict future storage requirements for LVM file systems.

For Virtual Server and file systems, an embodiment of the present invention may check file system information from a virtual server; check LVM file system utilization; and predict a future storage requirement.

For ASM file systems, an embodiment of the present invention may check the server for ASM file systems; and check the server if any ASM file systems are ready for reclaim, unused, etc.

For Veritas file systems, an embodiment of the present invention may check Veritas file systems; Check file system usage for Veritas file system and check for any unused Veritas file system on the servers.

For unallocated storage, an embodiment of the present invention may check unallocated (e.g., not assigned to any file system) storage on the server and check any ASM, Veritas unused storage on the server.

An embodiment of the present invention may be implemented on a three tier architecture where the data is not stored in a database for future reference. For example, the architecture may include a database to store the filtered data. An embodiment of the present invention may include data retrieval, data processing and data presentation.

FIG. 1 is an exemplary screenshot of a Free Disk Reporting interface, according to an embodiment of the present invention. In this example, the interface provides a report on a SAN Storage Disk for a list of hostnames. At 102, a storage device may be identified by file system identifier, server name, etc. The interface displays Total Free Disk Space 110 and Total Unused Disks 112. Disk Usage Report 120 may include hostname, site location, Application Identifier, Application Name, Environment (e.g., production, development, etc.), Status (e.g., installed), Sub Status, Unused Disks (number of), and Total Unused Disks Size (in GB). Other metrics and data may be provided.

Figure 2:
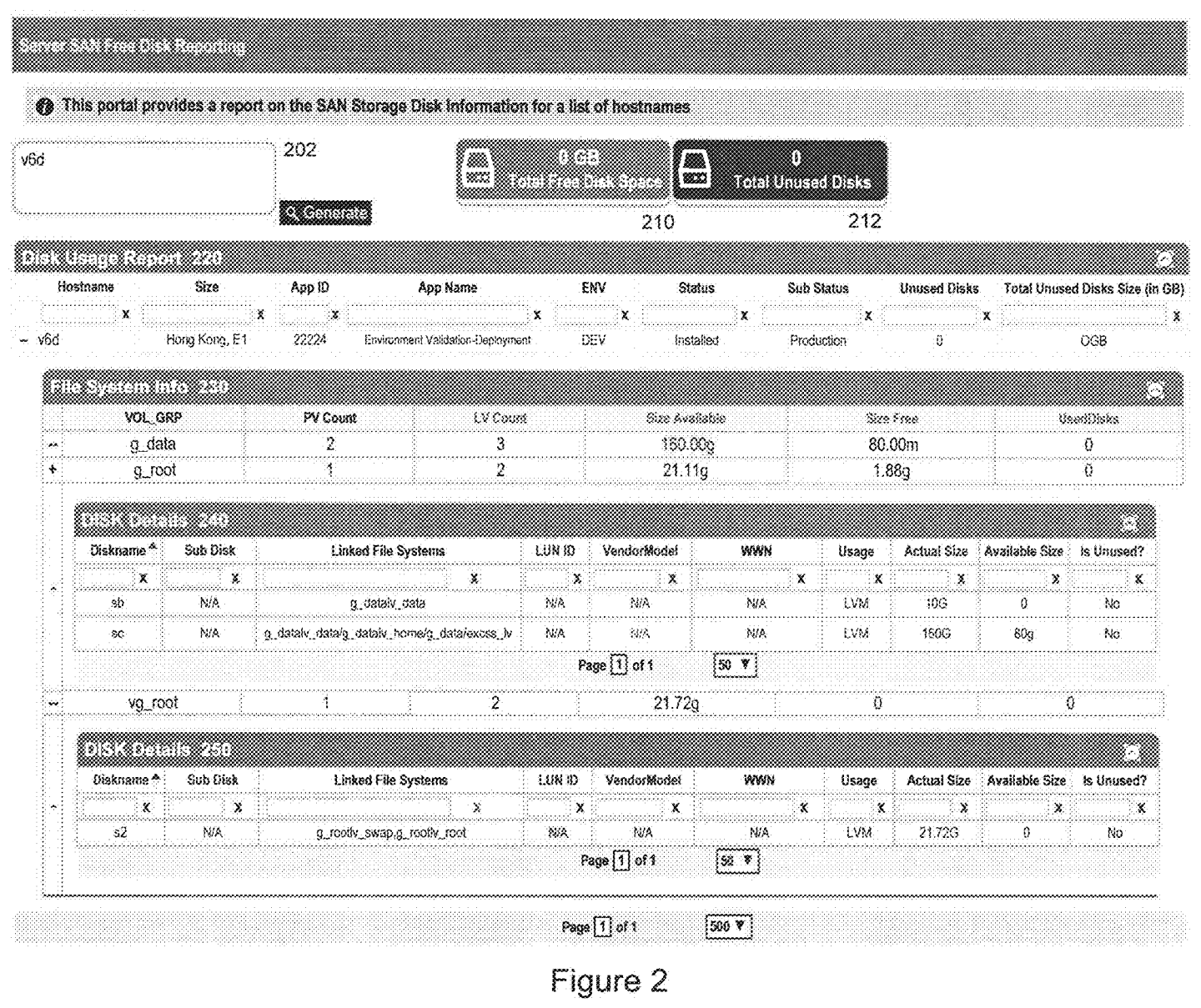

FIG. 2 is an exemplary screenshot of a Free Disk Reporting interface, according to an embodiment of the present invention. In this example, the interface provides a report on a SAN Storage Disk. At 202, a storage device may be identified by file system identifier, server name, etc. The interface displays Total Free Disk Space 210 and Total Unused. Disks 212. Disk Usage Report 220 may include File System Information that provides VOL_GRP (filesystem group name); PV Count (physical volume—physical disk identifier), LV Count (logical volume—actual filesystem identifier), Size Available, Size Free and Unused Disks. In addition, Disk Details may be provided at 240, 250. Disk Details 240 may include Diskname, Sub Disks, Linked File Systems, LUN ID, Vender Model, WWN, Usage, Actual Size, Available Size, and whether any portion of the disk is unused.

Figure 3:
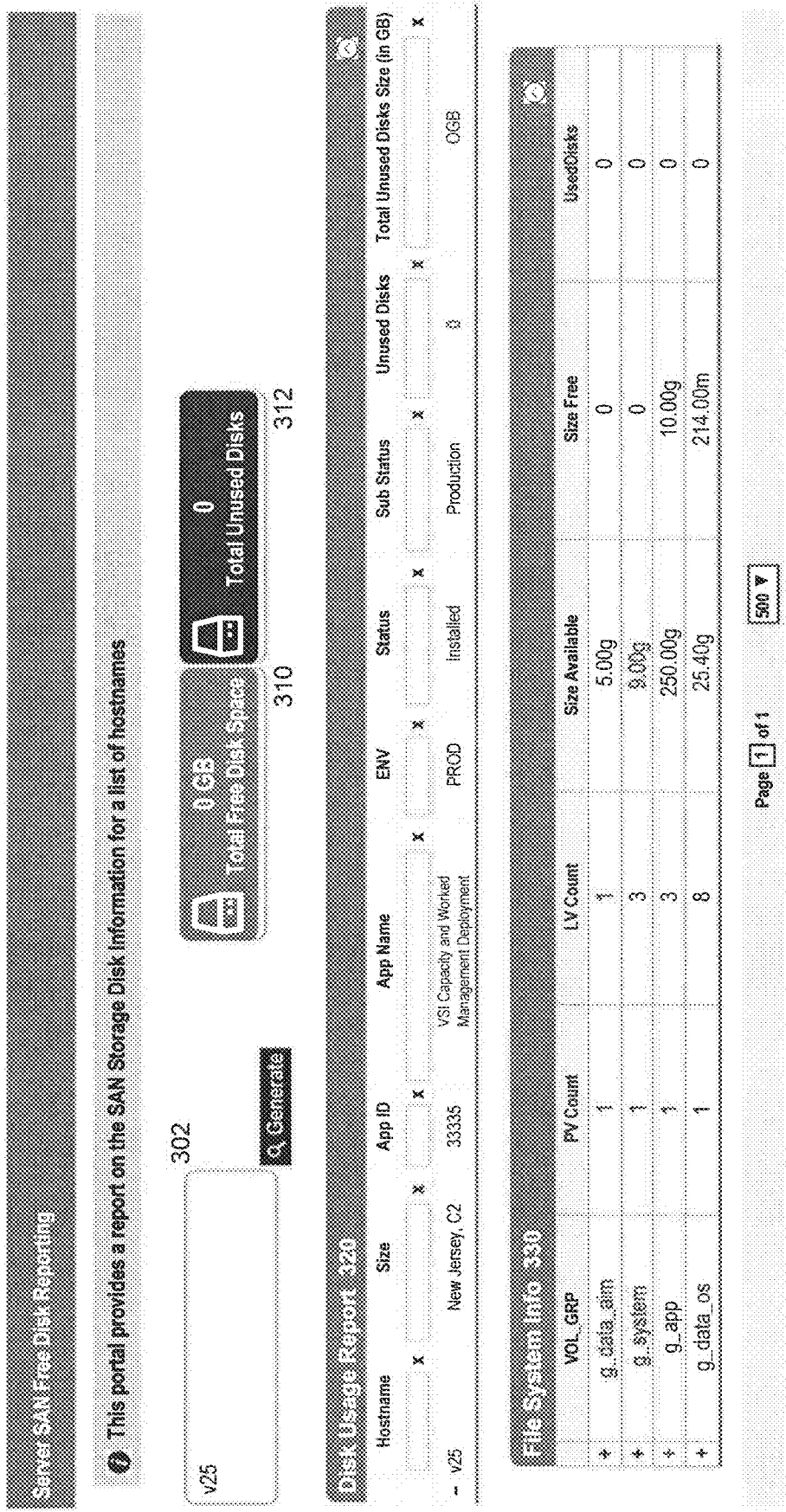
FIG. 3 is an exemplary screenshot of a Free Disk Reporting interface, according to an embodiment of the present invention.

FIG. 3 is an exemplary screenshot of a Free Disk Reporting interface, according to an embodiment of the present invention. At 302, a storage device may be identified by file system identifier, server name, etc. The interface displays Total Free Disk Space 310 and Total Unused Disks 312. Disk Usage Report 320 may be displayed. As shown in FIG. 3, File System information details may be provided at 330. File System information may include VOL_PRP, PV Count; LV Count; Size Available; Size Free and Used Disks.

Figure 4:
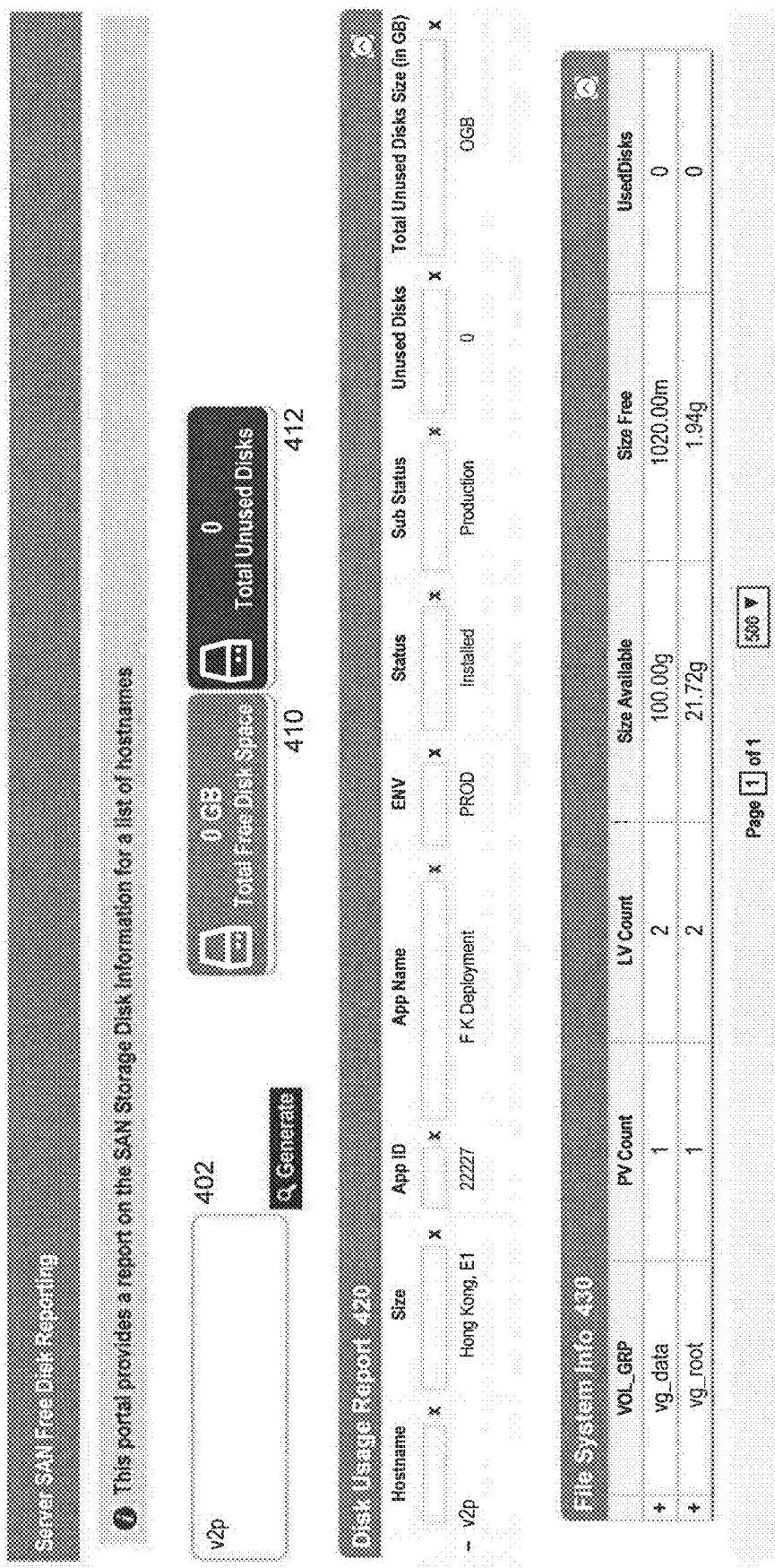
FIG. 4 is an exemplary screenshot of a Free Disk Reporting interface, according to an embodiment of the present invention.

FIG. 4 is an exemplary screenshot of a Free Disk Reporting interface, according to an embodiment of the present invention. At 402, a storage device may be identified by file system identifier, server name, etc. The interface displays Total Free Disk Space 410 and Total Unused Disks 412. Disk Usage Report 420 may be displayed. As shown in FIG. 4, File System information details may be provided at 430. File System information may include VOL_GRP; PV Count; LV Count; Size Available; Size Free and Used Disks.

The interfaces illustrated in FIGS. 1-4 are merely exemplary. Other variations, interactive icons and/or visuals may be supported by the various embodiments of the present invention.

Figure 5:
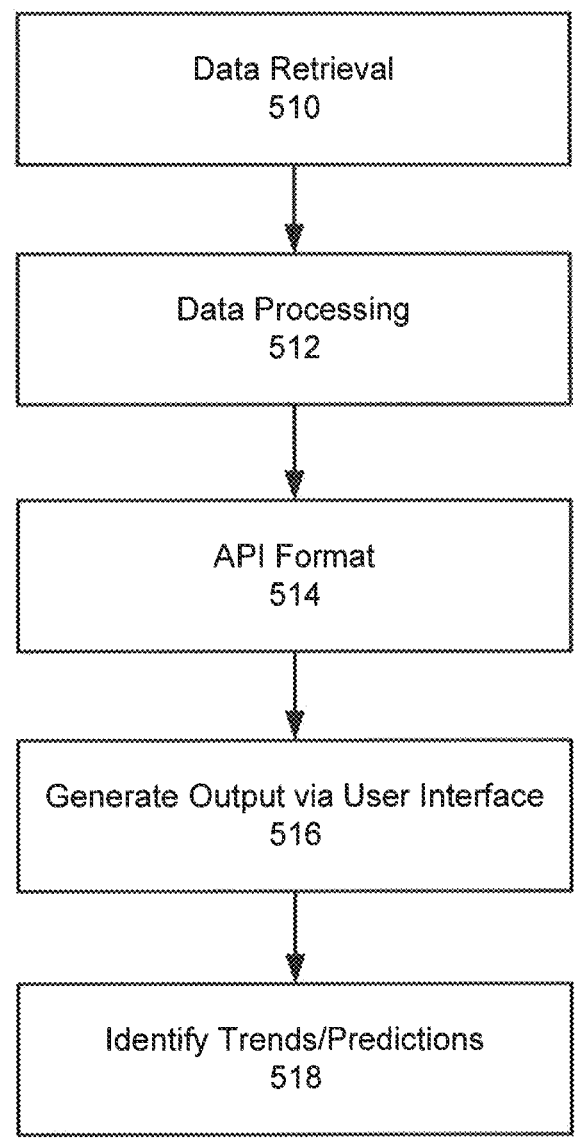
FIG. 5 is an exemplary flowchart for determining disk usage data, according to an embodiment of the present invention.

FIG. 5 is an exemplary flowchart for determining disk usage data, according to an embodiment of the present invention. At step 510, data may be retrieved. For example, data may be fetched from a data collection repository of network attached storage (NAS) servers and that data may be used for processing. At step 512, data processing may be performed. For example, data may be processed using the base script provided by Unix CIE team. Data may be formatted into an API format, as shown by step 514. File systems may work with an API that provides access to system function calls. At step 516, an output may be generated and displayed on an interactive user interface. At step 518, trends and/or predictions may be identified. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed. Additional details for each step may be provided below.

At step 510, data may be retrieved. For example, data may be fetched from a data collection repository of NAS servers and then processed at a centralized processor. With an embodiment of the present invention, a user is not required to login and access a server each time to determine disk usage data by writing and executing commands. An embodiment of the present invention enables a user to access disk usage data from outside the server through a data feed from various file systems, servers and/or storage systems. The data feed may access data from various vendor products and services. The data feed may be accessed weekly, daily, multiple times a day, other periodic basis and may also be initiated by a user or system.

At step 512, data processing may be performed. For example, data may be processed using the base script provided by Unix CIE team. Data from data feeds may be accessed by a centralized processor where the data is processed and compressed. Notably, data is not processed on a file system and the file system does not execute any runtime commands. Rather, an embodiment of the present invention receives data from the various file systems where the data is processed on a centralized processor. Data may be relevant to a single file system as well as many different file systems of various types. In addition, an embodiment of the present invention may store and manage historical data to provide trends as well as predictive data. Accordingly, an embodiment of the present invention may accurately and efficiently identify disk usage data without performing processing on the file system itself and without disturbing a business service.

Data may be formatted into an industry standard data format, e.g., JSON or other API format, at step 514. By using an API, an embodiment of the present invention provides an agnostic and extensible solution.

At step 516, an output may be generated. For example, API data may be used to display on an interactive user interface. Output may be at a server level, cluster level, as well as regional level. An embodiment of the present invention may provide specifics regarding type and/or location of disk availability. This may be provided in terms of cluster, server, rack as well as other specifics. Also, for a particular region (or other defined boundary), an embodiment of the present invention may provide a summary of data usage, availability of storage that may be reclaimed, etc. The region may refer to a geographic area as well as a datacenter location, Graphical views may provide a bird's eye view as well as other interactive views and illustrations.

At step 518, trends and/or predictions may be identified. An embodiment of the present invention may provide data capacity information on one or more file systems, servers, etc. The innovative system and method may provide a summary as well as detailed view of data that may be available to be reclaimed, this may be provided in GBs, TBs, etc. In addition, an embodiment of the present invention may provide data usage status on each server or group of servers, associated costs to maintain and savings by reclaiming. An embodiment of the present invention may provide rate of change (e.g., rate of increase, rate of decrease, etc.) as well as other trends and predictions.

For example, an embodiment of the present invention may identify storage availability at a particular location. The system may further identify that storage was added recently (e.g., the day before) so that storage is available for reclaim and use. According to another example, the system may determine that the available disk space has been unused for a period of time (e.g., the last 90 days). This indicates that the disk space is likely forgotten and there are no plans for use, Additional information may be provided that indicates future plans or intentions to use available disk space in the near term. This information may be useful in terms of long term planning so that available disk space is not otherwise offloaded or used by another user or team.

By using historical data to identify trends and predictions, an embodiment of the present invention may provide recommendations, suggestions for optimal data usage, etc. In addition, warnings, alerts and/or notifications may be provided when certain thresholds or critical situations are approaching.

Figure 6:
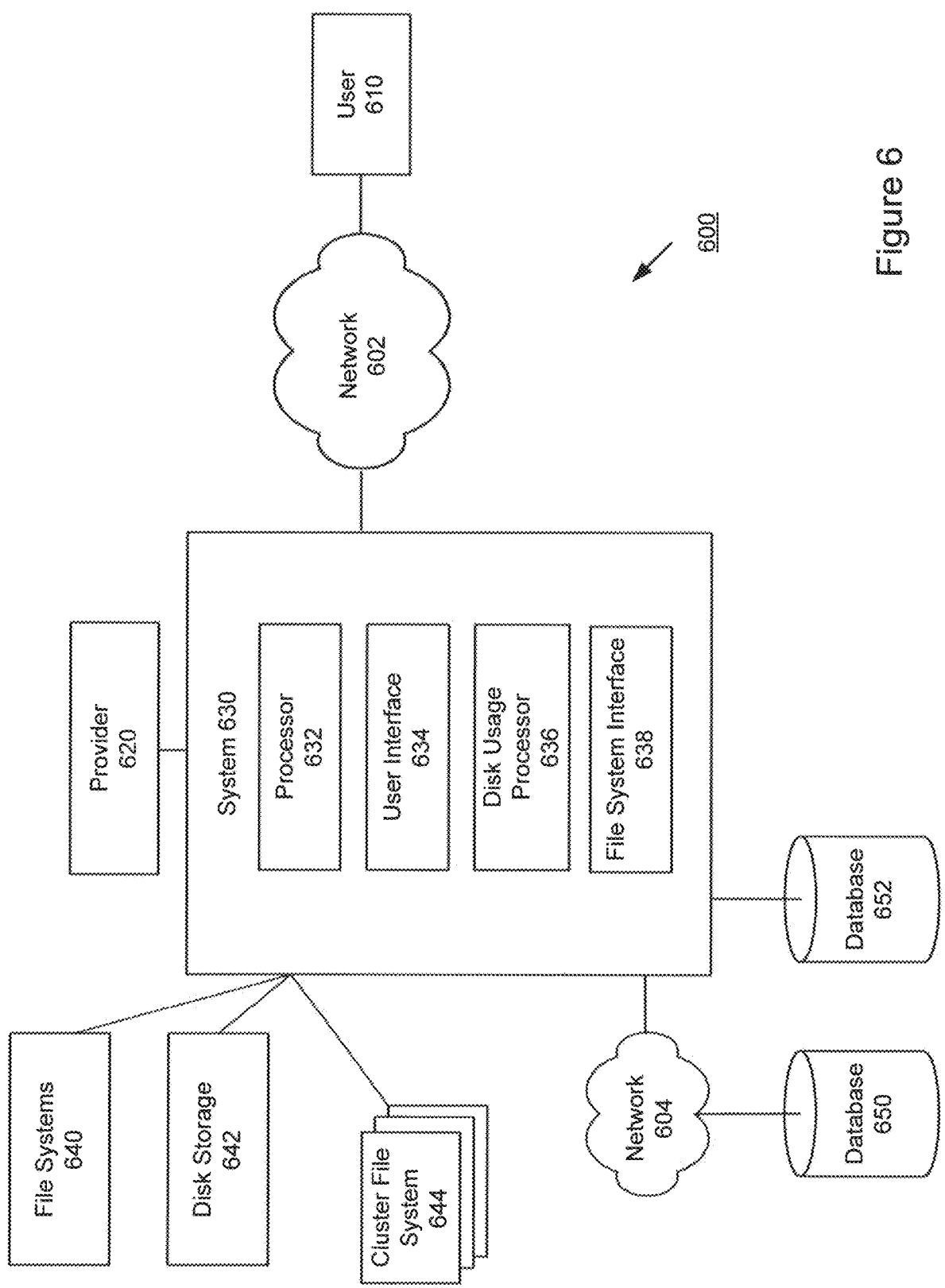
FIG. 6 is an exemplary system for reporting free disk space, according to an embodiment of the present invention.

FIG. 6 is an exemplary system for reporting disk usage space, according to an embodiment of the present invention. An embodiment of the present invention is directed to generating a report such as a free disk report. An embodiment of the present invention is directed to implementing a reporting tool for presenting information about the storage allocated to one or more Linux servers, file systems as well as other components, resources and/or systems. The data may then be used to aid decision making for performing reclaims of the storage which may be highlighted as unused.

As shown in FIG. 6, System 630 includes processing components, modules and functions. According to an exemplary implementation, System 630 may include Processor 632, User Interface 634, Disk Usage Processor 636, File System Interface 638 and various networking and communication components, Other functions and services may be supported.

User Interface 634 may generate and transmit an output to a requesting entity, end user and/or other recipient. The communication may be performed in real-time. The communication may be in a particular output format, link to a document, etc. The components illustrated in FIG. 6 are merely exemplary, other devices may be represented in various applications. While a single component is illustrated, each component may represent multiple components.

File System Interface 638 may communicate with various File Systems 640, Disk Storage 652 as well as Cluster File Systems 644. Other storage devices may be implemented.

System 630 may be hosted by a financial institution or other entity. According to another example, System 630 may be supported by a third party service provider 620. Other scenarios and architectures may be implemented.

System 630 may store and access data from various database components, including Database 650, 652. For example, disk storage data may be stored and managed in Databases 650, 652. Databases 650, 652 may represent remote as well as locate storage. Network 604 may provide access to Databases 650, 652.

Databases may be internal or external to System 630. Data may be stored and managed in storage components, represented by Database 650, via Network 604. System 630 may be communicatively coupled to Databases, represented by 650 and 652. Databases may include any suitable data structure to maintain the information and allow access and retrieval of the information. The storage may be local, remote, or a combination thereof with respect to Databases. Communications with Databases may be over a network, or communications may involve a direct connection between Databases and System 630, as depicted in FIG. 6. Databases may also represent cloud or other network based storage.

Network 602 may be communicatively coupled with various components in a network. User 610 may represent various types of users as well as other requesting entities. For example, User 610 may request data from System 630, via Network 602. System 630 may communicate with various users, represented by 610, using any mobile or computing device, such as a laptop computer, a personal digital assistant, a smartphone, a smartwatch, smart glasses, other wearables or other computing devices capable of sending or receiving network signals.

The system 600 of FIG. 6 may be implemented in a variety of ways. Architecture within system 600 may be implemented as hardware components (e.g., module) within one or more network elements. It should also be appreciated that architecture within system 600 may be implemented in computer executable software (e.g., on a tangible, non-transitory computer-readable medium) located within one or more network elements. Module functionality of architecture within system 600 may be located on a single device or distributed across a plurality of devices including one or more centralized servers and one or more mobile units or end user devices. The architecture depicted in system 600 is meant to be exemplary and non-limiting. For example, while connections and relationships between the elements of system 600 are depicted, it should be appreciated that other connections and relationships are possible. The system 600 described below may be used to implement the various methods herein, by way of example. Various elements of the system 300 may be referenced in explaining the exemplary methods described herein.

Network 602, 604 may be a wireless network, a wired network or any combination of wireless network and wired network. Although Network 602, 604 is depicted as one network for simplicity, it should be appreciated that according to one or more embodiments. Network 602, 604 may comprise a plurality of interconnected networks, such as, for example, a service provider network, the Internet, a cellular network, corporate networks, or even home networks, or any of the types of networks mentioned above. Data may be transmitted and received via Network 602, 604 utilizing a standard networking protocol or a standard telecommunications protocol.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenia operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner, Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner, Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example, Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for reporting disk usage in a file system, the method comprising the steps of:
receiving, via a data feed, data usage information fetched from one or more network attached storage (NAS) devices from a plurality of file systems, servers, and storage systems without logging in to any of the one or more NAS devices;
storing the received data feed data along with a historical set of data feed data;
processing, on a centralized processor that is not processed in any of the plurality of file systems, servers, or storage systems, the received data feed data using a base script provided by a Unix continuous improvement engineering team, wherein the processing include three tier architecture including data retrieval, data processing and data presentation where the data is not stored in a database for future reference;
applying predictive analytics to the data feed data as well as the historical set of data feed data to identify one or more data usage trends, including a need for more or less storage at a location, as well as one or more data usage predictions based on storage usage over time;
formatting the processed data into an industry standard application programming interface format;
generating a disk usage report using Free Disk Reporting (FDR) tool that provides insight to storage allocations in real-time, via the standard application programming interface formatted data, at a server level, a cluster level, and a regional level, based on the formatted processed data, wherein the disk usage report comprises file system information comprising a type and a location of disk availability; and
displaying the disk usage report on an interactive user interface, via a network connection, the interactive user interface providing one or more graphical views including a summary as well as detailed view of data that available to be reclaimed, a bird's eye view of a plurality of storage allocations, one or more configuration parameters, and storage utilization based on the disk usage report comprising unused data, and total unused disk size both within a file system and outside the file system but provisioned to an associated server, the graphical views selectable based on one or more defined boundaries, further displaying the one or more data usage trends, and the one or more data usage prediction and one or more of a warning, alert, and notification about a critical storage situation based on the one or more data usage trends and the one or more data usage prediction including indication of future plans to use available disk space.

2. The method of claim 1, wherein the disk usage report is generated without logging into each of the plurality of file systems.

3. The method of claim 1, wherein the processing of the data to generate disk usage report is limited to the centralized processor.

4. The method of claim 1, wherein the disk usage report comprises hostname, size, application identifier and application name.

5. The method of claim 1, wherein the disk usage report comprises environment and status.

6. The method of claim 1, wherein the disk usage report comprises number of unused disks and total unused disks size.

7. The method of claim 1, wherein the file system information comprises physical volume (PV) count and logical volume (LV) count.

8. The method of claim 1, wherein the file system information comprises size availability and size free.

9. The method of claim 1, wherein the file system information comprises number of used and unused disks.

10. The method of claim 1, wherein the interactive user interface graphically represents trends and predictions based on historical data.

11. A system for reporting disk usage in a file system, the system comprising:
a memory that stores disk storage data;
a input configured to receive data from a datafeed; and
a centralized computer processor, coupled to the memory and input, configured to perform the steps of:
receiving, via a data feed, data usage information fetched from one or more network attached storage (NAS) devices from a plurality of file systems, servers, and storage systems without logging in to any of the one or more NAS devices;
storing, in the memory, the received data feed data along with a historical set of data feed data;
processing, on a centralized processor that is not processed in any of the plurality of file systems, servers, or storage systems, the received data feed data using a base script provided by a Unix continuous improvement engineering team, wherein the processing include three tier architecture including data retrieval, data processing and data presentation where the data is not stored in a database for future reference;

applying predictive analytics to the data feed data as well as the historical set of data feed data to identify one or more data usage trends, including a need for more or less storage at a location, as well as one or more data usage predictions based on storage usage over time;

formatting the processed data into an industry standard application programming interface format;

generating a disk usage report using Free Disk Reporting (FDR) tool that provides insight to storage allocations in real-time, via the standard application programming interface formatted data, at a server level, a cluster level, and a regional level, based on the formatted processed data, wherein the disk usage report comprises file system information comprising a type and a location of disk availability; and displaying the disk usage report on an interactive user interface, via a network connection, the interactive user interface providing one or more graphical views including a summary as well as detailed view of data that available to be reclaimed, a bird's eye view of a plurality of storage allocations, one or more configuration parameters, and storage utilization based on the disk usage report comprising unused data, and total unused disk size both within a file system and outside the file system but provisioned to an associated server, the graphical views selectable based on one or more defined boundaries, further displaying the one or more data usage trends, and the one or more data usage prediction and one or more of a warning, alert, and notification about a critical storage situation based on the one or more data usage trends and the one or more data usage prediction including indication of future plans to use available disk space.

12. The system of claim 11, wherein the disk usage report is generated without logging into each of the plurality of file systems.

13. The system of claim 11, wherein the processing of the data to generate disk usage report is limited to the centralized processor.

14. The system of claim 11, wherein the disk usage report comprises hostname, size, application identifier and application name.

15. The system of claim 11, wherein the disk usage report comprises environment and status.

16. The system of claim 11, wherein the disk usage report comprises number of unused disks and total unused disks size.

17. The system of claim 11, wherein the file system information comprises physical volume (PV) count and logical volume (LV) count.

18. The system of claim 11, wherein the file system information comprises size availability and size free.

19. The system of claim 11, wherein the file system information comprises number of used and unused disks.

20. The system of claim 11, wherein the interactive user interface graphically represents trends and predictions based on historical data.

* * * * *